(12) United States Patent
Sarafianos et al.

(10) Patent No.: US 11,189,578 B2
(45) Date of Patent: Nov. 30, 2021

(54) ELECTRONIC CHIP

(71) Applicant: STMICROELECTRONICS (ROUSSET) SAS, Rousset (FR)

(72) Inventors: Alexandre Sarafianos, Pourrieres (FR); Bruno Nicolas, Aubagne (FR); Daniele Fronte, Rousset (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 98 days.

(21) Appl. No.: 16/409,704

(22) Filed: May 10, 2019

(65) Prior Publication Data

US 2019/0355673 A1  Nov. 21, 2019

(30) Foreign Application Priority Data

May 15, 2018  (FR) ...................... 1854055

(51) Int. Cl.
*H01L 23/528* (2006.01)
*H01L 23/00* (2006.01)
*G01N 27/04* (2006.01)
*H01L 23/522* (2006.01)

(52) U.S. Cl.
CPC ......... *H01L 23/576* (2013.01); *G01N 27/041* (2013.01); *G01N 27/045* (2013.01); *H01L 23/528* (2013.01); *H01L 23/5228* (2013.01)

(58) Field of Classification Search
None
See application file for complete search history.

(56) References Cited

U.S. PATENT DOCUMENTS

| | | | |
|---|---|---|---|
| 9,012,911 B2 | 4/2015 | Wuidart et al. | |
| 9,837,364 B2 | 12/2017 | Sarafianos et al. | |
| 2010/0026326 A1 | 2/2010 | Bartley et al. | |
| 2013/0193437 A1* | 8/2013 | Lisart | H01L 23/57 257/48 |
| 2016/0307855 A1 | 10/2016 | Charbonnier et al. | |
| 2017/0116439 A1 | 4/2017 | Sarafianos et al. | |
| 2018/0261560 A1 | 9/2018 | Sarafianos et al. | |

* cited by examiner

*Primary Examiner* — Cassandra F Cox
(74) *Attorney, Agent, or Firm* — Seed IP Law Group LLP (57) ABSTRACT

The disclosure concerns an electronic chip including a resistive region and a first switch of selection of a first area in contact with the resistive region.

26 Claims, 8 Drawing Sheets

ELECTRONIC CHIP

BACKGROUND

Technical Field

The present disclosure relates to electronic chips and in particular to the protection of a chip against attacks.

Description of the Related Art

Chips containing confidential data, such as bank card chips, are likely to be targeted by attacks.

A type of attack may be conducted from the back side of the chip, opposite to that where circuits containing the data are located. The attacker etches a portion of the back side to reach elements of the circuits such as transistors, diodes, or conductive tracks. The attacker can then access these elements, from which the attacker withdraws the data.

BRIEF SUMMARY

An embodiment overcomes all or part of the disadvantages of known electronic chips.

An embodiment overcomes all or part of the disadvantages of known device of protection against attacks.

Thus, an embodiment provides an electronic chip comprising a resistive region and a first switch of selection of a first area in contact with the resistive region.

According to an embodiment, the resistive region is coil-shaped.

According to an embodiment, the resistive region comprises a first well buried under second wells.

According to an embodiment, the first well is separate from the second wells.

According to an embodiment, the resistive region is a metal track located on a surface of the chip.

According to an embodiment, the resistive region is defined by a semiconductor substrate.

According to an embodiment, the chip comprises a second switch of selection of a second area in contact with the resistive region.

According to an embodiment, the first and second areas are located on the side of a surface of the chip.

According to an embodiment, the chip further comprises a detector of a difference between measured and expected electric resistance values between the first and second areas.

According to an embodiment, the chip is configured so that said expected value is a selected value.

According to an embodiment, the chip is configured so that the selected value is randomly selected.

According to an embodiment, the chip is configured so that a plurality of pairs of first and second areas between which the electric resistance has the expected value are sequentially selected.

An embodiment provides a method of protection of a chip against an attack, such as the chip discussed above.

According to an embodiment, the method comprises:
a) selecting the first and second areas; and
b) comparing with a threshold a difference between the measured and expected values.

An embodiment provides an electronic chip starting method comprising the implementation of the above method.

An embodiment provides an electronic chip comprising a resistive region and a device of connection to a node of a selectable number of first areas in contact with the resistive region.

According to an embodiment, the resistive region is defined by a semiconductor substrate.

According to an embodiment, said number is randomly selectable.

According to an embodiment, said number is selectable between 1 and 16.

According to an embodiment, the first areas are selectable from among regularly distributed areas.

According to an embodiment, the chip further comprises a detector of a difference between measured and expected electric resistance values between said node and a second area in contact with the resistive region.

An embodiment provides a device comprising the above chip.

According to an embodiment, the device comprises a metal plate located against a back side of the chip.

According to an embodiment, the first areas are located on the front side of the chip.

An embodiment provides a method of protecting the above device against an attack.

According to an embodiment, the method comprises:
selecting said number of first areas;
connecting the first areas to said node; and
comparing with a threshold a difference between the measured and expected values.

An embodiment provides an electronic chip starting method comprising the implementation of the above method.

The foregoing and other features and advantages will be discussed in detail in the following non-limiting description of specific embodiments in connection with the accompanying drawings.

DETAILED DESCRIPTION

The same elements have been designated with the same reference numerals in the various drawings and, further, the various drawings are not to scale. For clarity, only those steps and elements which are useful to the understanding of the described embodiments have been shown and are detailed. In particular, circuits of the chip containing confidential data are not detailed, the described embodiments being compatible with current circuits.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the concerned drawings in a normal position of use. The terms "approximately", "substantially", "about", and "in the order of" are used herein to designate a tolerance of plus or minus 10%, preferably of plus or minus 5%, of the value in question.

In the present description, unless otherwise specified, term "connected" designates a direct electric connection between two elements, for example, by conductive materials, while term "coupled" designates an electric connection between two elements which may be direct or via one or a plurality of passive or active components, such as resistors, capacitors, inductances, diodes, transistors, etc.

Figure 1:
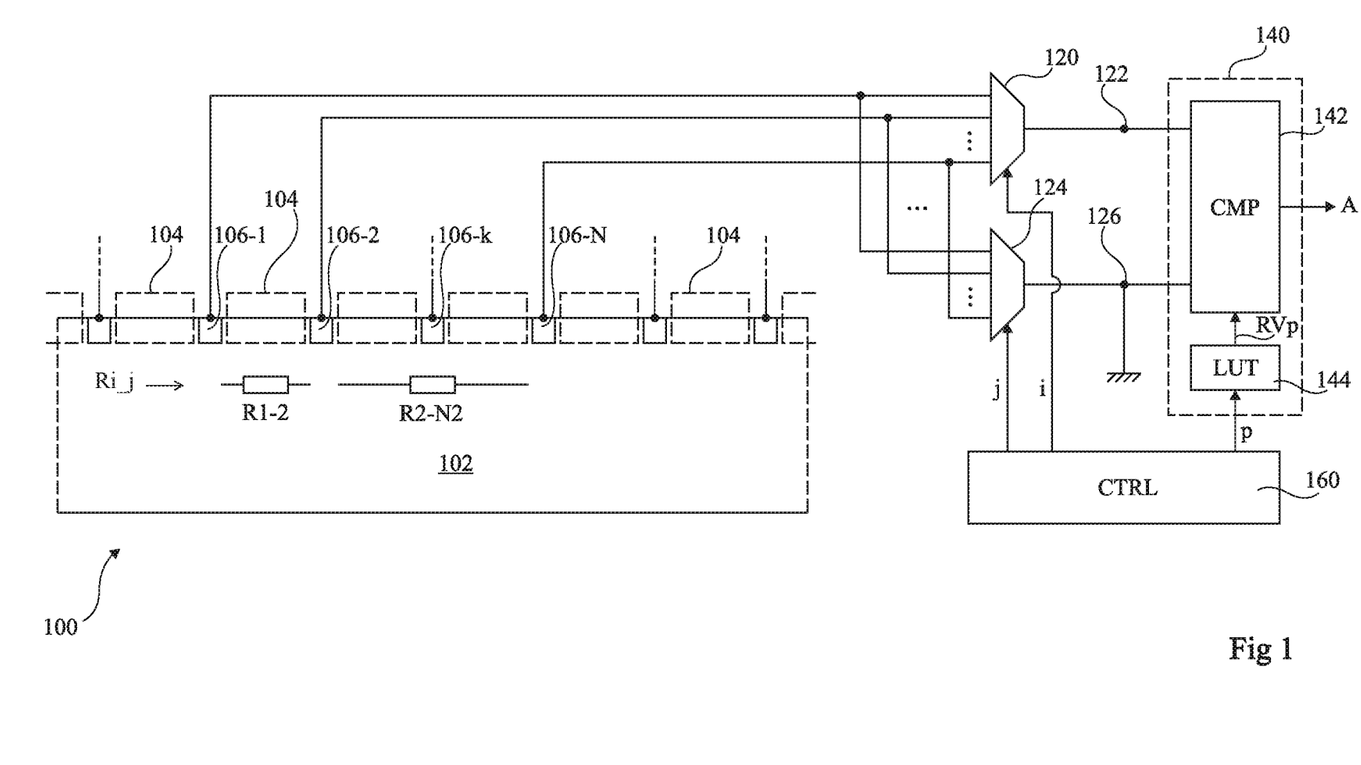
FIG. 1 schematically illustrates an embodiment of a device of protection of an example of electronic chip.

FIG. 1 schematically illustrates an embodiment of a device of protection of an example of an electronic chip 100. Chip 100 is partially shown in cross-section view. The protection device is for example comprised in the chip.

Chip 100 comprises an electrically-resistive region 102 preferably defined in a semiconductor substrate, for example, made of silicon. Circuits to be protected of the chip are located inside and on top of the substrate in regions 104.

Chip 100 comprises areas or contacts 106-1, 106-2 . . . 106-N (collectively 106-$k$) in contact with resistive region 102. Each area 106-$k$ is for example a more heavily-doped area of the same conductivity type as the substrate. Contacts 106-$k$ are distributed between regions 104, preferably regularly. An example of distribution is described hereafter in relation with FIG. 3.

Chip 100 comprises a selection switch 120. Switch 120 is coupled, for example, connected, to contacts 106-$k$. In operation, switch 120 receives a control signal, for example, having a value i, for example, integer, in the range from 1 to N1. Switch 120 selects a first contact according to value i from among contacts 106-$k$. Switch 120 then connects the first contact 106-$k$ to a node 122, that is, enables a current to flow between the first contact 106-$k$ and node 122. Switch 120 electrically isolates the non-selected contacts.

Preferably, the chip further comprises a selection switch 124. Switch 124 is coupled, for example, connected, to contacts 106-$k$. In operation, switch 124 receives a control signal for example having a value j, for example, integer, in the range from 1 to N2. The switch 124 selects a second contact according to value j from among contacts 106-$k$. Switch 124 then connects the second contact to a node 126, that is, enables a current to flow between the second contact and node 126. Switch 124 electrically isolates the non-selected contacts.

Thus, switches 120 and 124 are arranged to electrically connect nodes 122 and 126, to opposite ends of a resistor comprising a portion of resistive region 102. As an illustration, resistors R1-2 and R2-N2 respectively corresponding to i=1 and j=2, and to i=2 and j=N2 have been shown. Each resistor Ri-j has an expected value. The expected value is for example a value provided on design of resistor Ri-j. The expected value may also be the measured value of a reference resistance. The reference resistance is for example identical to resistance Ri-j, that is, comprises, to within the variability of the manufacturing method, the same materials as those of resistor Ri-j, arranged identically. The expected value depends in particular on the distance between contacts 106-$i$ and 106-$j$. The various resistors Ri-j have expected values from among a number M of possible expected values RVp according to values i and j, p being a value, for example, integer, in the range from 1 to M. A plurality of pairs of values i and j may correspond to a same expected value RVp of resistor Ri-j, for example, when the first and second contacts selected according to the values i and j are at a same distance from each other.

As an example, nodes 122 and 126 are connected to a detection circuit 140 configured to detect an attack and supply an alert signal A in case of an attack.

Circuit 140 for example comprises a detector 142 (CMP) which compares a measured value of resistor Ri-j between nodes 122 and 126 with the corresponding expected value RVp. Detector 142 is connected to nodes 122 and 126 and supplies signal A. In practice, it is provided for node 126 to be a node of application of a fixed potential, for example, a reference potential such as ground.

Detector 142 is preferably a detector of a difference greater than a threshold between a measured value of the resistance between nodes 122 and 126 and the corresponding expected value RVp. The difference is for example in absolute value. Preferably, the threshold is provided so that there is no detection when the difference is only or mainly due to the variability of the chip manufacturing process.

Circuit 140 may further comprise a circuit 144 (LUT) arranged to supply expected value RVp to detector 142. Circuit 144 for example comprises a memory comprising a lookup table between value p and the corresponding expected value RVp.

The chip may further comprise a control circuit 160 (CTRL) arranged to supply values i, j, and p.

During the chip operation, test phases are provided, preferably during the chip starting. During the test phase, control circuit 160 selects value p, for example, randomly. The corresponding expected value RVp is thus randomly selected from among the various expected values. Control circuit 160 selects pairs of values i and j for which the expected value is the selected RVp value. Preferably, pairs of values i and j for which the expected value is the selected value RVp are then sequentially selected during the test phase. Such pairs for example correspond to a same distance between contacts 106-$i$ and 106-$j$. An example of a sequence of selection of values i and j is described hereafter in relation with FIGS. 4A to 4C.

Figure 2:
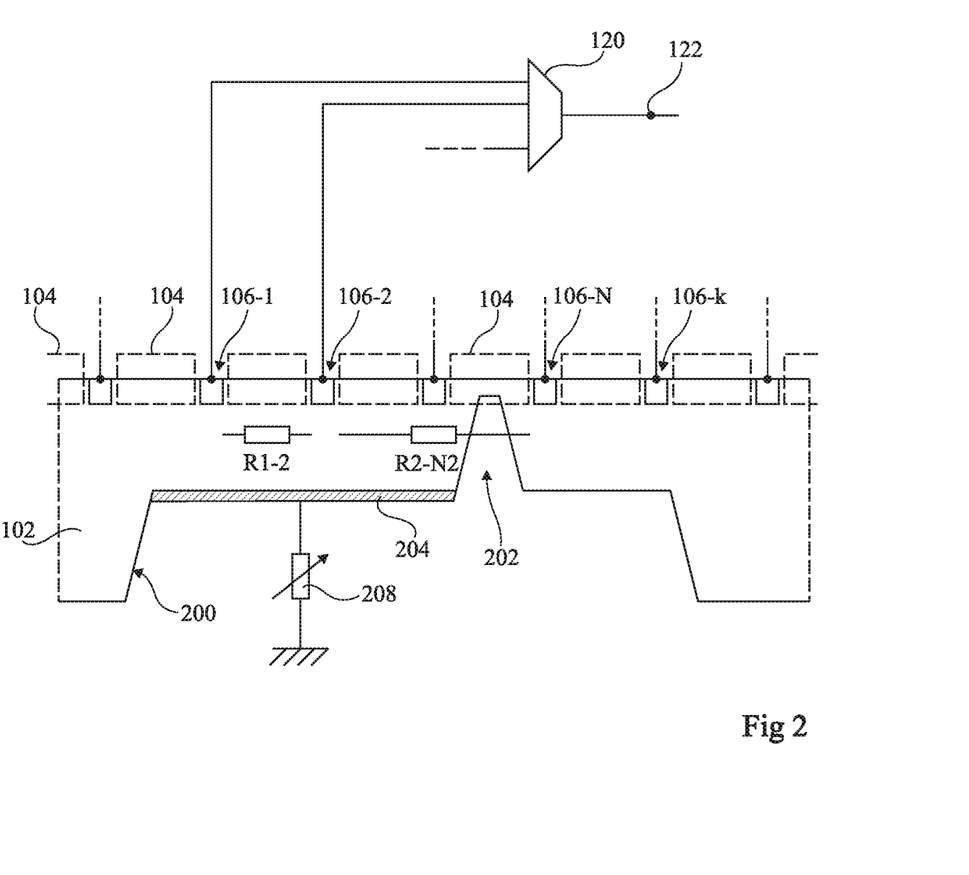
FIG. 2 is a cross-section view of the chip of FIG. 1 during an attack attempt.

FIG. 2 is a cross-section view of the chip of FIG. 1 during an attack attempt.

A portion 200 of the back side has been etched. At the bottom of etched portion 200, a cavity 202 is etched towards the components of one of regions 104. A plurality of cavities 202 may be etched from portion 200. Cavity 202 may be etched by a focused ion beam. Preferably, the lateral dimensions of cavity 202 are smaller than 20 µm, for example, in the range from 2 to 10 µm. Portion 200 has lateral dimensions preferably greater than 5 times those of cavity 202, for example, from 10 to 20 times greater. Portion 200 has lateral dimensions typically greater than 100 µm, for example, in the range from 100 µm to 200 µm.

The presence of cavity 200 influences the value of the resistance of electrically resistive region 102 located between two of contacts 106-$k$. In the illustrated example, the value of resistance R2-N2 between contacts 106-2 and 106-$N_2$ is higher than what it was before the attack. The difference between the measured value of resistance R2-N2 and the corresponding expected value causes the emission of alert signal A by detector 140. Signal A is used by the chip to start countermeasures intended to make the attack fail, for example, stopping the chip operation. Signal A may be used by the chip to take any usual countermeasure to stop the attack.

To counter the detection of the etching of portion 200, another attack comprises forming a metallization 204 at the bottom of etched portion 200. Metallization 200 is coupled to ground by a resistor 208, preferably with an adjustable resistance. The value of resistance 208 enabling to avoid detection of the attack is then searched for. However, due to the fact that the expected value RVp changes for each test phase, no setting of resistance 208 now enables to avoid detection of the attack. Further, due to the fact that expected value RVp changes randomly, no succession of settings of resistance 208 enables the hacker to obtain the confidential data of the chip. The obtained chip is thus particularly efficiently protected against attacks.

Figure 3:
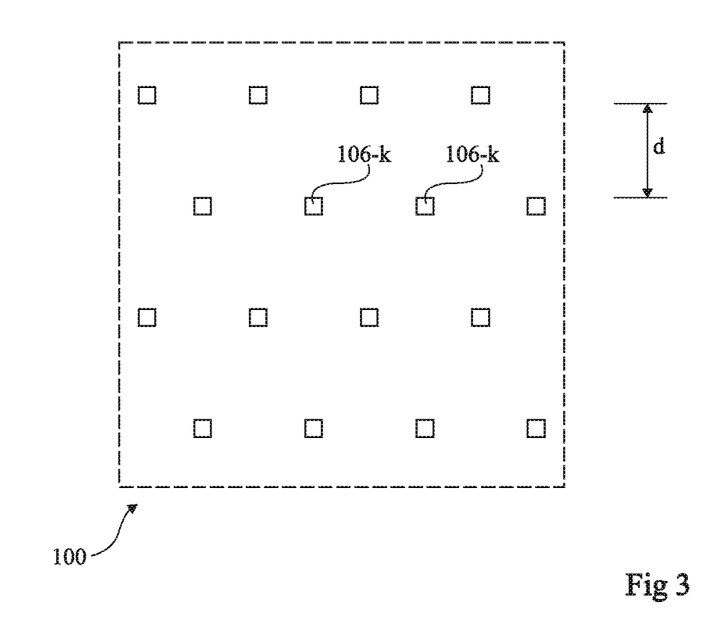
FIG. 3 is a simplified top view of a portion of the chip of FIG. 1.

FIG. 3 is a simplified top view of an example of a portion of chip 100 of FIG. 1.

Contacts 106-$k$ are regularly distributed in rows. The rows are separated by a distance d typically in the range from 10 to 50 µm, preferably approximately 25 µm. The distance between contacts of a same row is for example approximately equal, preferably equal, to the distance between rows. A contact may have lateral dimensions smaller by 10% than distance d, for example, in the range from 0.2 to 2 µm. As an example, the contacts coupled to switches 120 and 124 form a group of 16 contacts. The contacts of the group are for example distributed in a square. The group of 16 contacts may be repeated in the chip, for example, regularly. The contacts of each group can then be coupled, for example, connected, to switches 120 and 124 of other attack detection devices similar to those of FIG. 1. Although a group of 16 contacts has been provided in this example, groups comprising any number of contacts greater than or equal to two may be provided.

Figure 4A:
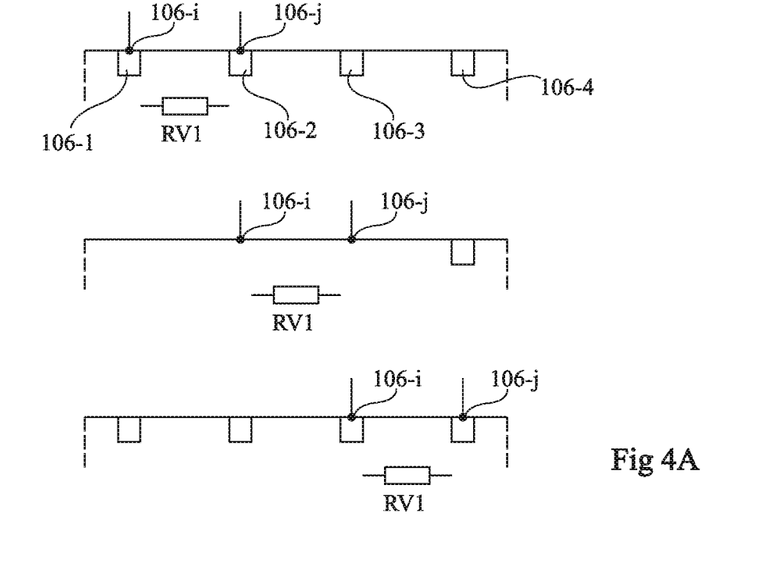
FIGS. 4A to 4C partially and schematically illustrate sequences of detection of an attack.
Figure 4B:
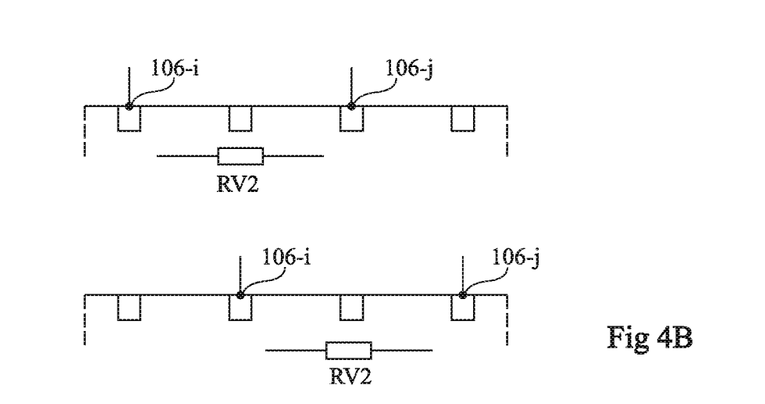
Figure 4C:
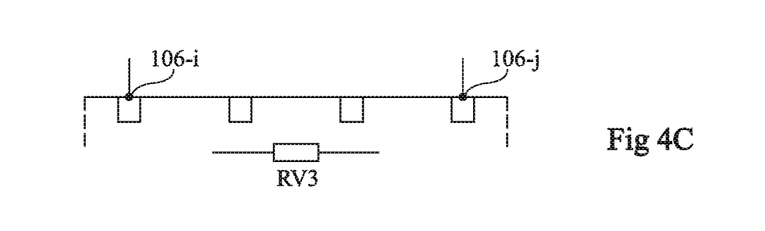

FIGS. 4A to 4C partially and schematically illustrate examples of sequences of detection of an attack of the chip of FIG. 1. The sequences of FIGS. 4A to 4C for example concern a group of four contacts of the chip, bearing references 106-1 to 106-4 from left to right.

For each test phase of the chip, one of the sequences of FIGS. 4A to 4C is selected by the control circuit, preferably randomly.

The sequence of FIG. 4A comprises three steps. The neighboring pairs of contacts are successively selected. The three steps correspond to a same expected resistance value RV1. At the first step, values i and j are respectively equal to 1 and 2. At the second step, values i and j are respectively equal to 2 and 3. At the third step, values i and j are respectively equal to 3 and 4.

The sequence of FIG. 4B comprises two steps. The pairs of contacts between which a single contact can be found are successively selected. The two steps correspond to a same expected resistance value RV2. At the first step, values i and j are respectively equal to 1 and 3. At the second step, values i and j are respectively equal to 2 and 4.

The sequence of FIG. 4C comprises a single step at which the pair of contacts 106-1 and 106-4 is selected. This corresponds to an expected value RV3.

The sequences of FIGS. 4A to 4C may be adapted to groups of more or less than four contacts. More or less than three possible sequences can then be obtained. Further, although sequences for aligned contacts have been illustrated herein, sequences concerning contacts arranged differently on the front side of the chip may also be provided, for example according to the layout described in relation with FIG. 2. In this case, each sequence may successively comprise steps for which contacts 106-$i$ and 106-$j$ are at a same distance, preferably randomly selected.

Figure 5:
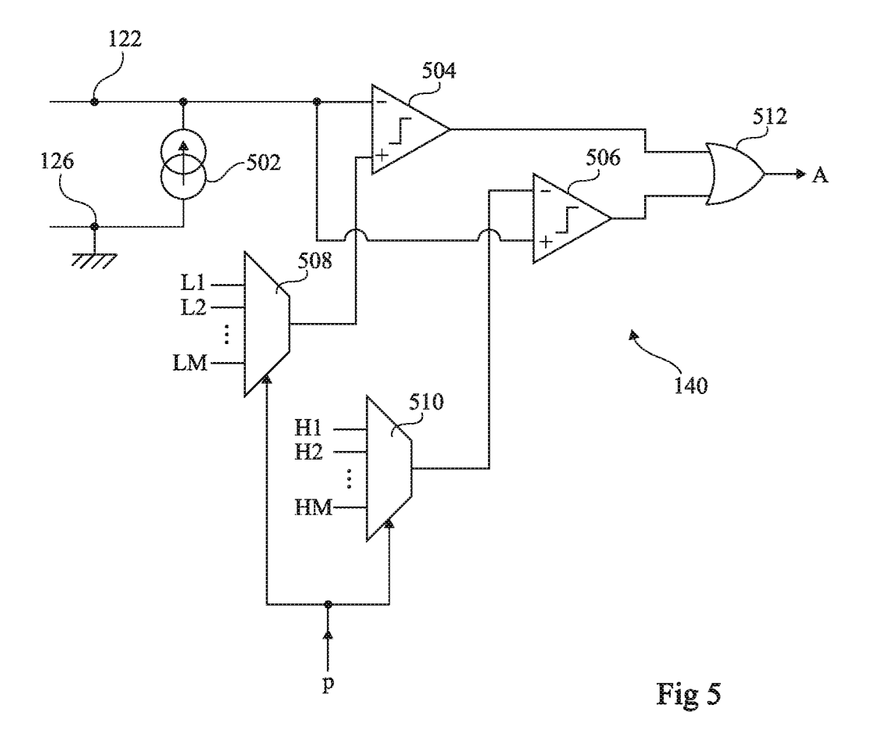
FIG. 5 schematically shows an embodiment of a detector of the device of FIG. 1.

FIG. 5 schematically illustrates an example of a detector 140 of an electronic chip protection device.

Detector 140 comprises a current source 502 between nodes 126, for example, connected to ground, and node 122. Node 122 is coupled, for example, connected, to a negative (inverting) input of a comparator 504. Further, node 122 is coupled, for example, connected, to a positive (non-inverting) input of a comparator 506. The positive input of comparator 504 is coupled, for example, connected, to the output of a selection switch 508. Switch 508, for example, a multiplexer controlled by value p, is arranged to select a signal Lp (L1, L2 . . . LM) according to value p. The negative input of comparator 506 is coupled, for example, connected, to the output of a selection switch 510. Switch 510, for example, a multiplexer controlled by value P, is arranged to select a signal Hp (H1, H2 . . . HM) according to value p. The outputs of comparators 504 and 506 are coupled, for example, connected, to the inputs of an OR gate 512 intended to deliver alert signal A in the occurrence of an attack.

Each value Lp corresponds to the expected resistance value RVp decreased by a threshold value. Each value Hp corresponds to the expected resistance value RVp increased by a threshold value. Each expected value may be supplied by a device for measuring the resistance of a resistive element of the chip. As an example, this resistive element is formed between two contacts 106-$k$ arranged so that the expected value of the resistance between the two contacts is value RVp.

An attack attempt is detected when, during a test phase, the measured value of resistance Rp is outside of the range from Lp to Hp. Values Lp and Hp are preferably provided so that the associated ranges are separate.

Figure 6A:
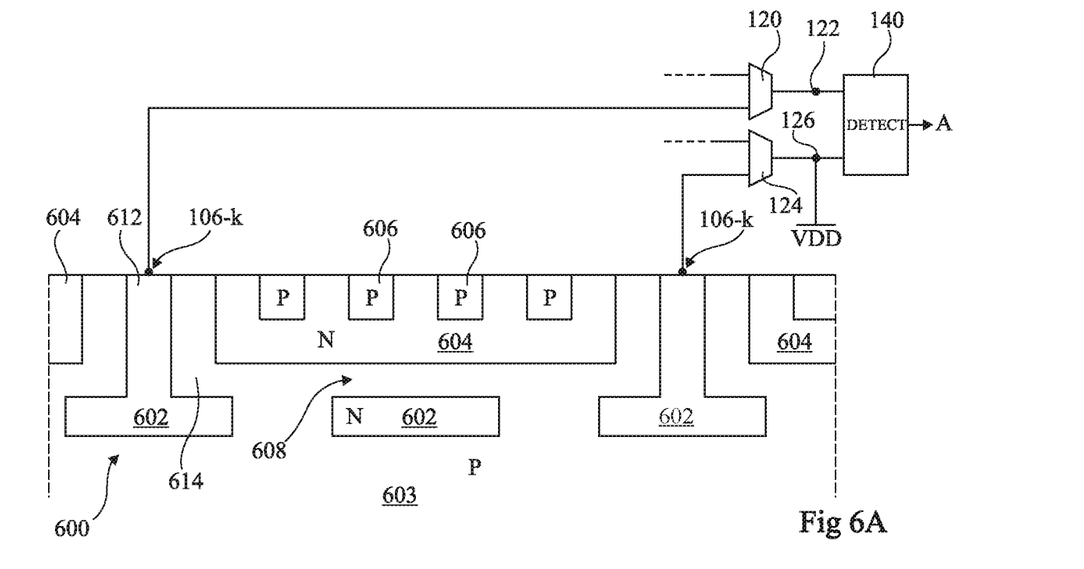
FIG. 6A is a partial simplified cross-section view of another example of an electronic chip.
Figure 6B:
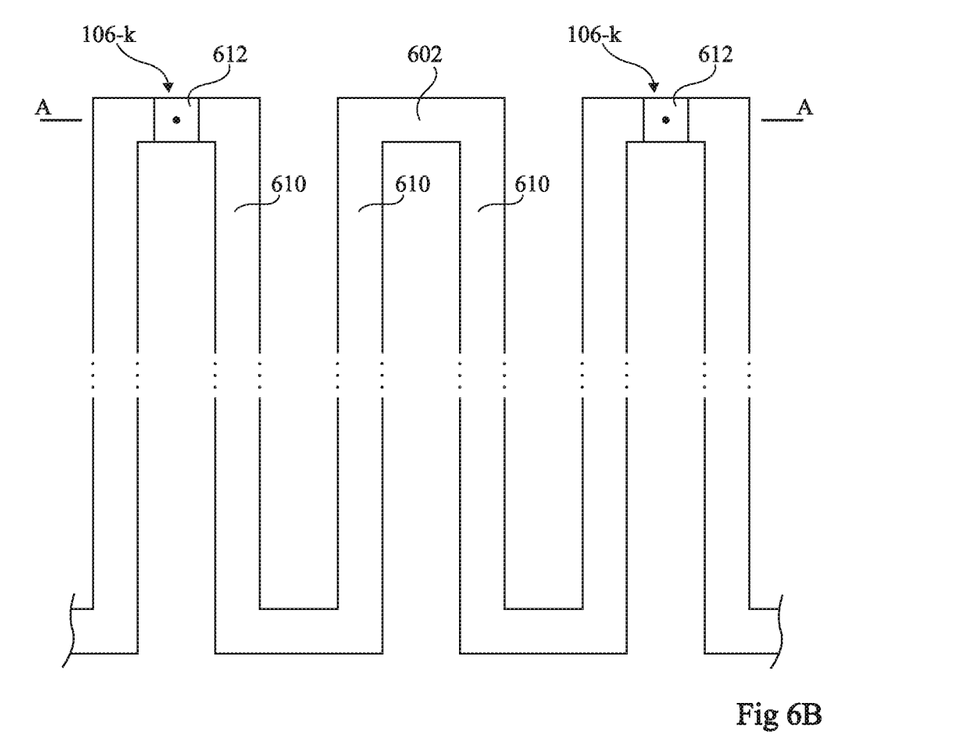
FIG. 6B is a simplified top view of an embodiment of a resistive region of the chip of FIG. 6A.

FIG. 6A is a partial simplified cross-section view of an embodiment of an electronic chip 600 comprising a resistive region 602 in a substrate 603, according to a cross-section plane A-A shown in FIG. 6B. FIG. 6B is a simplified top view of resistive region 602. Chip 600 comprises the same protection device, not shown in FIGS. 6A and 6B, as chip 100 of FIG. 1.

Chip 600 comprises a semiconductor substrate 603, for example, P-type doped. Substrate 603 is for example connected to ground. One or a plurality of N-type doped wells 604 extend in substrate 603 from the front side. P-type doped wells 606, for example, regularly spaced apart, are located in the N wells on the front side of N wells 604. Elements of the circuit to be protected of the electronic chip, not shown, are formed inside and on top of wells 604 and 606.

Resistive region 602 is an N-type doped region buried under wells 604. Region 602 is separate from wells 604. Region 602 is for example separated from wells 604 by a portion 608 of the substrate. As an example, region 602 has, in top view, a coil shape. The coil comprises portions 610 parallel to one another, and portions coupling the ends of each portion 610 to a neighboring portion 610. Portions 610 are for example regularly arranged. Neighboring portions 610 are preferably separated by a distance shorter than the lateral dimensions of cavities that an attacker is likely to etch. Portions 610 are for example separated by a distance shorter than 10 µm, preferably shorter than 5 µm. Portions 610 are typically strip-shaped. The strip width is for example in the range from 30% to 150% of the distance between neighboring portions 610, for example, in the range from 2 to 5 µm. The width of the strips and the distance between neighboring portions 610 may depend on the depth of the buried wells.

As an example, contacts 106-*k* are each defined by a contacting area 612 extending from the front side of substrate 603 to resistive region 602. Areas 612 are for example N-type doped wells. Areas 612 are separated from wells 604. Areas 612 are for example surrounded with portions 614 of the substrate separating areas 612 from wells 604. Contacts 106-*k* are for example regularly distributed along the coil. Contacts 106-*k* may be arranged on the portions coupling neighboring portions 610.

Node 126 is for example a node of application of a potential VDD. The application of a potential VDD enables to reverse-bias the PN junction between N resistive region 602 and the surrounding P doped substrate. For two selected values i and j, detection circuit 140 compares measured and expected values of the resistance of the coil portion comprised between contacts 106-*i* and 106-*j*.

In case of an attack of the type described in relation with FIG. 2, a cavity damages the coil. A resistor of variable resistance may be coupled, for example, connected, to the damaged coil. Due to the fact that the expected resistance value randomly changes for each test phase, no value of the variable resistance enables to conceal the attack attempt.

Figure 7:
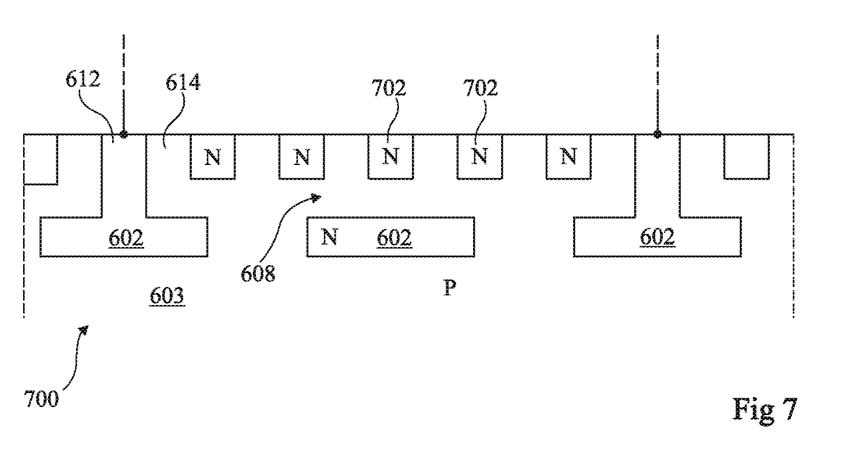
FIG. 7 is a partial simplified cross-section view of another example of an electronic chip.

FIG. 7 is a partial simplified cross-section view of an embodiment of an electronic chip 700. Chip 700 of FIG. 7 differs from chip 600 of FIGS. 6A and 6B in that chip 700 comprises no N wells 604 and in that chip 700 comprises N-type doped wells 702. N wells 702 are for example regularly spaced apart on the front side of the substrate. Elements of the circuits to be protected are located inside and on top of N wells 702 and the portions of substrate 603 located between N wells 702.

Resistive buried region 602 is located under N wells 702. Region 602 is separate from N wells 702. Region 602 is for example separated from N wells 702 by a portion 608 of the substrate. Contacting areas 612 are surrounded with regions 614 of the substrate which separate them from N wells 702.

The conductivity types of the doped regions of chips 600 and 700 described hereabove may be inverted. The directions of the voltages and currents applied to measure the resistance between contacts 106-*i* and 106-*j* may be inverted if need be.

As a variation, the coil-shaped buried resistive region of chips 600 and 700 described hereabove may be replaced with a coil-shaped resistive region located above the circuits on the front side, or located on the back side of the chip. The resistive coil-shaped region may further be formed of a conductor, for example, metallic. As an example, the resistive region is a coil shaped conductive track located in electric insulator layers covering the front side of the chip. The chip is then protected against front-side attacks.

Figure 8:
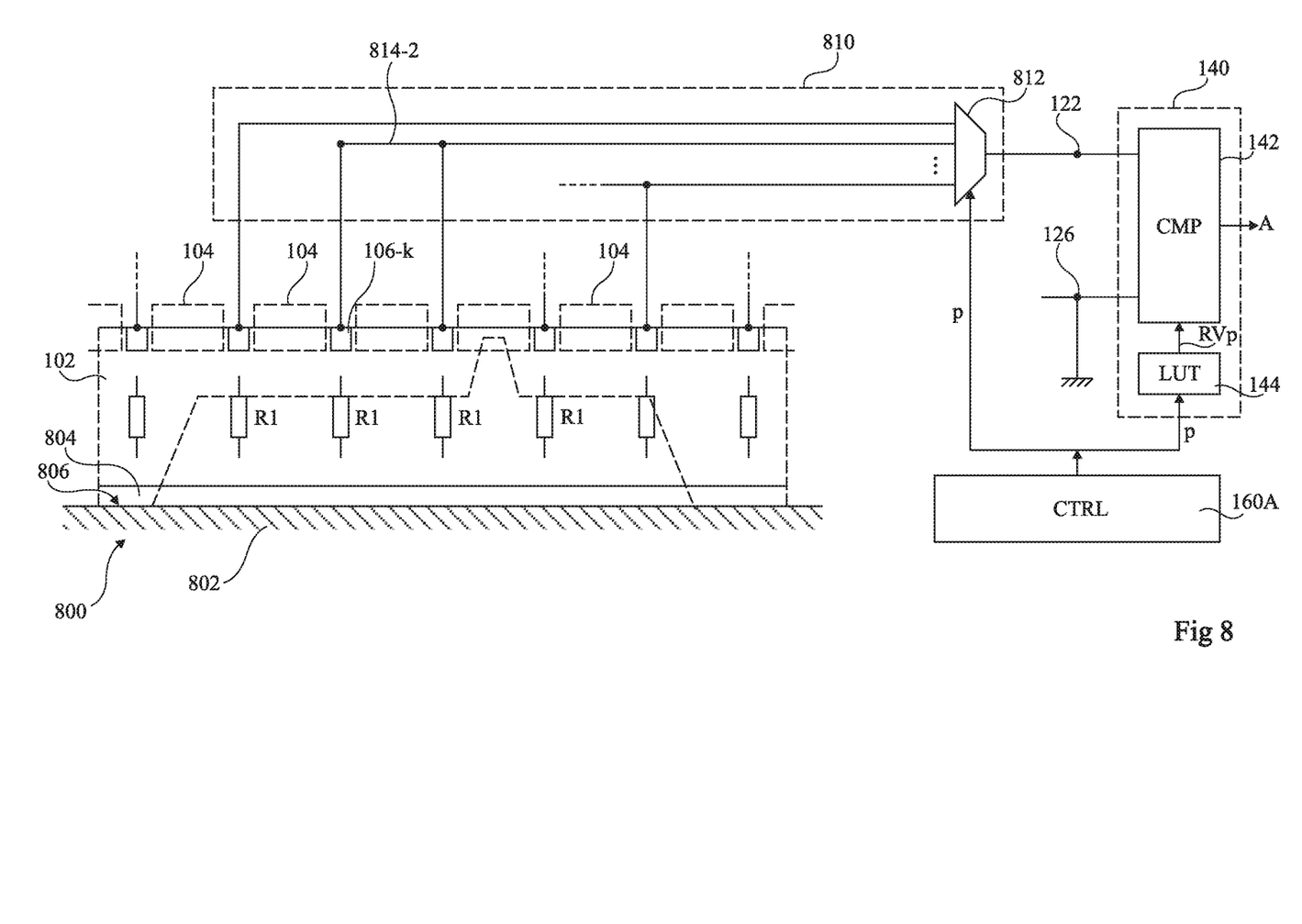
FIG. 8 schematically shows another embodiment of a device of protection of an electronic chip.

FIG. 8 schematically illustrates another embodiment of a device of protection of an electronic chip 800.

The chip of FIG. 8 comprises elements identical or similar to those of FIG. 1, arranged identically or similarly. Chip 800 of FIG. 8 differs from chip 100 of FIG. 1 in that:

the chip 800 rests on a conductive plate 802, for example, a ground plane, and comprises a region 804 capable of forming an electric contact 806 between the back side of the substrate and conductive plate 802;

switches 120 and 124 of FIG. 1 are replaced with a connection device 810; and control circuit 160 is replaced with a control circuit 160A capable of supplying a value p, which is for example an integer in the range from 1 to M.

Connection device 810 is arranged to receive value p and select a number p of contacts from among contacts 106-*k* of the chip. Connection device 810 then connects the p selected contacts for example to node 122, that is, enables current to flow between the selected contacts and node 122. Connection device 810 electrically insulates the non-selected contacts.

As an example, device 810 comprises connections 814-*q*, q being an integer in the range from 2 to M'. Each connection 814-*q* couples together, for example, connects together, a number q of contacts from among contacts 106-*k*. As an illustration, a connection 814-2 coupling two contacts 106-*k* has been shown. Device 810 may comprise a selection switch 812 coupled to one of contacts 106-*k* and to connections 814-*q*. When value p is equal to 1, the selection switch selects contact 106-*k*. When value p is greater than 1, switch 812 selects connection 814-*p*.

As a variation, not shown, the connection device comprises, for each contact 106-*k*, a switch, for example, a transistor, between contact 106-*k* and node 122. The connection device can then be configured to simultaneously turn on a number of switches equal to value p.

Thus, when value p is equal to 1, device 810 enables to connect, between nodes 122 and 126, a resistor R1 of expected value RV1, corresponding to a vertical portion of substrate 102 between plate 802 and the considered contact 106-*k*. If value p is greater than 1, the switch enables to connect, in parallel, a number of portions of the substrate equal to value p. The expected value RVp of these portions in parallel is for example in the order of RV1/p. The expected value RV1 is for example in the range from 200 kΩ to 1 MΩ, preferably in the order of 500 kΩ The expected value RV1 may depend on the doping level of the substrate and on its thickness. Different expected values RVp can thus be obtained according to value p.

For each test phase, the control circuit selects value p, preferably randomly so that the expected value RVp is randomly selected.

To attempt an attack, one may separate the chip from ground plane 802. The electric contact between the back side of the substrate and node 126 is thus suppressed. The protection device detects the attack attempt and countermeasures are taken.

An electric contact may be reestablished between the back side and the ground, for example, a conductive wire. An attack of the type described in relation with FIG. 2 can then be attempted, that is, by etching a portion 200 of the back side and by etching a cavity 202. The resistance value of a portion of the resistive region is modified. Such a resistance value differs from the expected value, and the attack attempt is thus detected. To avoid the detection by the chip, a resistor of adjustable resistance may be coupled, for example, connected, between the bottom of etched portion 200 and the ground, as described in relation with FIG. 2. However, due to the fact that the expected value RVp is randomly selected, no setting of the adjustable resistance enables to avoid for the attack attempt to be detected.

Specific embodiments have been described. Various alterations, modifications, and improvements will readily occur to those skilled in the art.

Various embodiments with different variations have been described hereabove. It should be noted that those skilled in the art may combine various elements of these various embodiments and variations without showing any inventive step. In particular, the layout of contacts 106-*k* described in relation with FIG. 3 is applicable to chip 800 of FIG. 8. Further, the contacts of chip 800 may be gathered as described in relation with FIG. 3. As an example, for a group of sixteen contacts, it may be provided for the value of p to be in the range from 1 to 16. Further, the detector of FIG. 5 is compatible with chip 800 of FIG. 8.

Finally, the practical implementation of the described embodiments is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting.

The various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic chip comprising:
a coil-shaped resistive region;
a first contact area in contact with the resistive region; and
a first switch configured to select the first contact area in contact with the resistive region.

2. The chip of claim 1, further comprising first wells, wherein the resistive region comprises a second well buried under the first wells.

3. The chip of claim 2, wherein the second well is separated from the first wells.

4. The chip of claim 1, wherein the resistive region is a metal track located on a surface of the chip.

5. The chip of claim 1, comprising a semiconductor substrate, wherein the resistive region is formed in the semiconductor substrate.

6. The chip of claim 1, comprising:
a second contact area in contact with the resistive region; and
a second switch configured to select the second contact area in contact with the resistive region.

7. The chip of claim 6, wherein the first and second contact areas are located on a side of a surface of the chip.

8. The chip of claim 6, further comprising a detector configured to detect a difference between measured and expected electric resistance values between the first and second contact areas.

9. The chip of claim 8, wherein said expected value is a selected value.

10. The chip of claim 9, wherein the selected value is randomly selected.

11. The chip of claim 1, comprising:
a plurality of first and second contact areas, the first contact area being part of the first plurality of contact areas;
a selector that includes the first switch and a plurality of additional switches the selector configured to sequentially select a pair of first and second contact areas among the plurality of pairs of first and second contact areas, the resistive region includes a respective resistor between the first and second contact areas of each pair, each respective resistor having a threshold electric resistance; and
a detector configured to detect a measured electric resistance between the first and second contact areas of each of the pairs and detect a difference between the measured electric resistance and the threshold electric resistance.

12. A method of protecting an electronic chip against an attack, the method comprising:
selecting first and second contact areas coupled to respective first and second portions of a resistive region of the electronic chip;
determining a measured resistance value of a portion of the resistive region between the first and second portions; and
comparing with a threshold a difference between the measured resistance value and an expected value.

13. The method of claim 12, wherein the selecting, determining, and comparing steps are performed in response to starting the electronic chip.

14. An electronic chip comprising:
a resistive region;
a node; and
a connection device configured to connect to the node a selectable number of first contact areas in contact with the resistive region.

15. The chip of claim 14, wherein the resistive region is defined by a semiconductor substrate.

16. The chip of claim 15, further comprising a detector configured to detect a difference between measured and expected electric resistance values between said node and a second contact area in contact with the resistive region.

17. The chip of claim 14, wherein said number is randomly selectable.

18. The chip of claim 14, wherein said number is selectable between 1 and claim 16.

19. The chip of claim 14, wherein the first areas are selectable from among regularly distributed areas.

20. A device comprising:
an electronic chip that includes:
a resistive region;
a node; and
a connection device configured to connect to the node a selectable number of first contact areas in contact with the resistive region; and
a selector configured to select the number of first contact areas.

21. The device of claim 20, comprising a metal plate located against a back side of the chip.

22. The device of claim 21, wherein the first areas are located on a front side of the chip.

23. A method of protecting a device against an attack, the method comprising:
selecting a number of first contact areas coupled to respective portions of a resistive region of an electronic chip of the device;
connecting the first contact areas to a node;
determining a measured resistance value of a portion of the resistive region between the first contacts; and
comparing with a threshold a difference between the measured resistance value and an expected value.

24. The method of claim 23, wherein the selecting, connecting, determining, and comparing steps are performed in response to starting the electronic chip.

25. An electronic chip comprising:
a resistive region, the resistive region being a metal track located on a surface of the chip;
a first contact area in contact with the resistive region; and
a first switch configured to select the first contact area in contact with the resistive region.

26. The chip of claim 25, comprising:
a second contact area in contact with the resistive region;
a second switch configured to select the second contact area in contact with the resistive region; and a detector configured to detect a difference between measured and expected electric resistance values between the first and second contact areas.

\* \* \* \* \*

UNITED STATES PATENT AND TRADEMARK OFFICE
CERTIFICATE OF CORRECTION

PATENT NO. : 11,189,578 B2
APPLICATION NO. : 16/409704
DATED : November 30, 2021
INVENTOR(S) : Alexandre Sarafianos et al.

Page 1 of 1

It is certified that error appears in the above-identified patent and that said Letters Patent is hereby corrected as shown below:

In the Claims

Column 10, Claim 18, Line 29:
"between 1 and claim 16." should read: -- between 1 and 16. --

Signed and Sealed this
Thirty-first Day of May, 2022

Katherine Kelly Vidal
*Director of the United States Patent and Trademark Office*